(12) United States Patent
Neltner et al.

(10) Patent No.: US 11,358,747 B2
(45) Date of Patent: Jun. 14, 2022

(54) LOW OPACITY THERMOFORMED CONTAINER HAVING LONGITUDINAL SEAM

(71) Applicant: The Procter & Gamble Company, Cincinnati, OH (US)

(72) Inventors: Andrew Eric Neltner, Loveland, OH (US); Marko Stojanovic, Cincinnati, OH (US); Joseph Craig Lester, Liberty Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 553 days.

(21) Appl. No.: 16/397,058

(22) Filed: Apr. 29, 2019

(65) Prior Publication Data
US 2020/0339299 A1    Oct. 29, 2020

(51) Int. Cl.
*B65D 1/02*    (2006.01)
*B65D 23/14*    (2006.01)

(52) U.S. Cl.
CPC ......... *B65D 1/0207* (2013.01); *B65D 1/0276* (2013.01); *B65D 23/14* (2013.01); *B65D 2501/0081* (2013.01)

(58) Field of Classification Search
CPC .... B65D 1/0207; B65D 1/0276; B65D 23/14; B65D 2501/0081; B65D 1/00; B65D 1/02; B65D 1/0215; B65D 1/0292; B65D 1/32; B65D 2501/00; B65D 2501/0009; B65D 23/085; B29C 66/4322
See application file for complete search history.

(56) References Cited

U.S. PATENT DOCUMENTS

| | | | |
|---|---|---|---|
| 2,194,147 A | 3/1940 | Alfons |
| 3,307,738 A | 3/1967 | Theodore |
| 3,422,174 A | 1/1969 | Hagen |
| 3,700,513 A | 10/1972 | Haberhauer |
| 4,116,607 A | 9/1978 | Legrand |
| 4,624,821 A | 11/1986 | Younkin |
| 4,948,001 A | 8/1990 | Magly |
| 5,599,495 A | 2/1997 | Krall |

(Continued)

FOREIGN PATENT DOCUMENTS

| | | |
|---|---|---|
| CN | 1655955 A | 8/2005 |
| EP | 2321113 B1 | 1/2013 |

(Continued)

OTHER PUBLICATIONS

Ammon, Jim, Injection Molding: Mold Construction and Part Design, 20 pages, Sep. 4, 2008, http://idsa.sjsu.edu/Archive%20documents/injection%20molding%20lecture%2009-04-08 .pdf.

(Continued)

*Primary Examiner* — Don M Anderson
(74) *Attorney, Agent, or Firm* — Gary J. Foose

(57) ABSTRACT

A container formed of a common one-piece thermoplastic substrate. The container has an overlapping seam having an overlap magnitude. At a location that is five times the overlap magnitude away from the overlapping seam, the container wall has a container wall Opacity less than about 50%. At a corresponding position along the overlapping sea, the overlapping seam has a seam Opacity that is less than 200% of the container wall Opacity.

12 Claims, 17 Drawing Sheets

(56) References Cited

U.S. PATENT DOCUMENTS

| | | | |
|---|---|---|---|
| 5,628,417 | A | 5/1997 | Van Halteren |
| 5,730,694 | A | 3/1998 | Hagleitner |
| 5,813,197 | A | 9/1998 | Aguzzoli |
| 10,532,847 | B2 | 1/2020 | Etesse |
| 2002/0066740 | A1 | 6/2002 | Hermodsson |
| 2005/0006385 | A1 | 1/2005 | D Amato |
| 2005/0051574 | A1 | 3/2005 | Kesselman |
| 2005/0139569 | A1 | 6/2005 | Larsen |
| 2007/0090121 | A1 | 4/2007 | Harp |
| 2009/0169780 | A1 | 7/2009 | Kimura et al. |
| 2011/0303673 | A1 | 12/2011 | Wilkes |
| 2011/0315592 | A1 | 12/2011 | Pennington |
| 2012/0031870 | A1 | 2/2012 | Porter |
| 2014/0069943 | A1 | 3/2014 | Kunz |
| 2014/0072245 | A1 | 3/2014 | Dede |
| 2015/0096957 | A1 | 4/2015 | Etesse |
| 2015/0203236 | A1* | 7/2015 | Etesse .................... B65D 1/023 215/43 |
| 2015/0375900 | A1 | 12/2015 | Larson |
| 2016/0046059 | A1 | 2/2016 | Kunz |
| 2019/0358887 | A1* | 11/2019 | Lester .................... B29C 49/02 |
| 2019/0359383 | A1* | 11/2019 | Neltner ............. B65D 23/0864 |
| 2020/0171734 | A1 | 6/2020 | Galt |
| 2020/0354529 | A1* | 11/2020 | Neltner ................ B32B 27/306 |

FOREIGN PATENT DOCUMENTS

| | | |
|---|---|---|
| FR | 2851227 A1 | 8/2004 |
| JP | S5460348 A | 5/1979 |
| WO | WO9419240 A1 | 9/1994 |
| WO | WO2008062224 A1 | 5/2008 |
| WO | WO2010007004 A1 | 1/2010 |
| WO | WO2009144559 A3 | 8/2010 |
| WO | WO2012152433 A1 | 11/2012 |

OTHER PUBLICATIONS

Bockner, Gordon, The Agami Sheet-Fed Bottle, 2 pages, Jun. 15, 2011, Packaging Strategies News, http://digital.bnpmedia.com/article/The+Agami+Sheet-Fed+Bottle/7 5 5819/72683/article.html.

Mekchai, Ratchaneekorn, Roll N Blow Thermoforming Machine, 4 pages, Apr. 18, 2011, Business France Thailand, http://www.youbuyfrance.com/th/Posts-2595-roll-n-blow-thermoformingmachine.

Extended European Search Report and Search Opinion; Application No. 20170400.4; dated Sep. 28, 2020; 7 pages.

Review of the Development of Plastic Packaging Containers for Food Products), Xiaofei Lv et al., Standard Science, 2019. No. 2, 4 pgs. (English Abstract).

* cited by examiner

LOW OPACITY THERMOFORMED CONTAINER HAVING LONGITUDINAL SEAM

FIELD OF THE INVENTION

A low opacity thermoformed container formed of a one-piece thermoplastic substrate

BACKGROUND OF THE INVENTION

Blow molded containers can be fabricated from flat substrates. One process employed to manufacture such containers is to form the flat substrate into a tube in which one of the edges of the flat substrate overlap with the opposing edge. The overlapping portion is bonded to formed a coherent tube. The tube can be fed into a blow mold. The blow mold is closed and pinches the bottom of the tube. A blowing cane is present at the top part of the tube. Heated air is forced into the tube to thermoform the tube into conformance with the blow mold. The blow mold is then opened and the blown container is removed.

For many consumer products, it is beneficial to the consumer to be able to see the contents of the container prior to opening and dispensing the contents of the container. This is especially true at the point of purchase in a retail environment. If the container is overly opaque, the consumer cannot see the contents and therefore cannot visually judge the quality and suitability of the contents to fulfill her or his needs. The consumer may open the container to visually inspect the contents. This can contaminate or otherwise spoil the contents, particularly if the consumer chooses not to purchase the product and the next shopping consumer purchases the previously opened product.

Low opacity containers are available in the market place. Such containers may be glass or plastic. Labeling such containers can be complicated because labels are applied after formation of the container or during formation of the container. Technical approaches including pressure sensitive labels, heat transfer labels, direct object printing, in-mold labeling, and like technologies each add cost to the finished container. The labels and labeling process for containers can account for a significant fraction of the cost of the container.

One problem with blow molded containers fabricated from flat substrates is that the bonded portions of the finished container may appear distinctly different from the remainder of the container, which can interfere with labelling of the container and can end up being a portion of the container through which the contents are not suitably visible.

With these limitations in mind, there is a continuing unaddressed need for low opacity thermoformed thermoplastic containers formed from a flat substrate in which the seams do not interfere with labelling of the container and are not so opaque that the contents are not suitably visible through such seams.

SUMMARY OF THE INVENTION

A container comprising: an open end; a closed end opposing said open end; a container wall extending longitudinally between said closed end and said open end about a longitudinal axis; an end seam extending at least partially across said closed end; and a longitudinal overlapping seam extending from said end seam, a portion of said overlapping seam extending longitudinally along said container wall from said closed end to said open end; wherein said open end is narrower than at least a portion of said container away from said open end of said container; wherein a common one-piece thermoplastic substrate forms both said closed end and said container wall; wherein said container has a height extending between said closed end and said open end; wherein at a position along said overlapping seam said container wall has an overlap magnitude; wherein at said position along said overlapping seam at a location that is five times the overlap magnitude away from said overlapping seam said container wall has a container wall Opacity less than about 50%; and wherein at said position along said overlapping seam said overlapping seam has a seam Opacity that is less than 200% of said container wall Opacity.

DETAILED DESCRIPTION OF THE INVENTION

Figure 1:
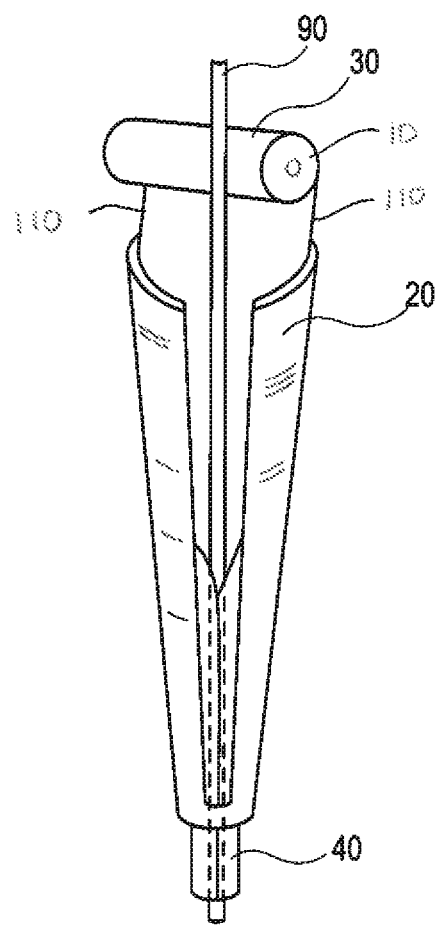
FIG. 1 is a drawing of an apparatus for forming a web into a loose conduit.

A container as contemplated herein can be formed as follows. First a web 30 can be provided wrapped around an unwinding roll 10, as shown in FIG. 1. The web 30 can be a planar web of thermoplastic sheet substrate. The web 30 can be a planar web of thermoplastic sheet substrate comprising a composition selected from the group consisting of polyethylene terephthalate, polystyrene, polypropylene, polyethylene, polyvinyl chloride, nylon, ethyl vinyl alcohol, and laminated sheets or mixtures thereof. The web 30 can be a multi-layer sheet or web of material. The web 30 can comprise a polyolefin. The web 30 can have a thickness of between about 200 μm and about 2000 μm. The web 30 can have a thickness of between about 200 μm and about 1000 μm. The web 30 can have a thickness of between about 300 μm and about 800 μm. The web 30 can comprise an ethylene vinyl alcohol (EVOH) layer having thickness between about 1 μm and about 30 μm, or even about 3 μm to about 10 μm, or even about 10 μm and about 30 μm. The web 30 can comprise an EVOH layer having thickness between about 10 μm and about 30 μm, or even about 3 μm to about 10 μm, sandwiched between two layers of polyolefin material. The web 30 can have a pair of web lateral edges 110 spaced apart from one another in the cross direction CD. The web or webs employed herein can have a Opacity less than about 50% when conformed to the mold.

The web 30 can be a laminate of different materials. The web 30 can be a co-extrusion of different materials. The web 30 can consist of a singular polymeric material. The web 30 can have one or more barrier layers. Since it is generally thought to be less complicated to form flat webs comprised of multiple layers than it is to form multi-layered containers by the processes of extrusion blow molding, injection blow molding, injection stretch blow molding, and the like, the process disclosed herein of forming a planar web into a container and the resulting containers are thought to be particularly practical. The web 30 can be fed through a forming guide 20 to gradually form the planar web 30 into a loose conduit 40. The forming guide 20 can be a funnel or be a section of a funnel or a portion of a funnel. The forming guide 20 can be a plate of metal or plastic having a shape such that as the web 30 is unwound from the roll 10, the web 30 is gradually deformed into the shape of a loose conduit 40 in a manner such that the loose conduit is free from wrinkles, folds, or creases. The forming guide 20 can be a solid material or can be provided with one or more of apertures, slots, grooves, ridges, and the like to help the flat web 30 be transitioned from a flat web 30 into loose conduit 40. The forming guide 20 can be a series of wires set in a frame to have the shape of a funnel or a section of funnel or portion of a funnel. The forming guide 20 can be comprises of a mesh or screen material. In essence, the forming guide 20 need only to be able to assist in transitioning the flat web 30 into loose conduit 40. The web 30 moves through the forming guide 20 to be formed into loose conduit 40. The web 30 and loose conduit 40 move towards the conformer. Movement of the web 30 and loose conduit 40 can be indexed with opening and closing of the conformer so as to move when the conformer is in an open position.

The forming guide 20 can be set around a blowing cane 90 that extends through the forming guide 20 such that that loose conduit 40 is wrapped around or partially around the blowing cane 90. The blowing cane 90 provides for pressurized and or heated gas that is used in a subsequent portion of the process to form the container by blow molding.

Figure 2:
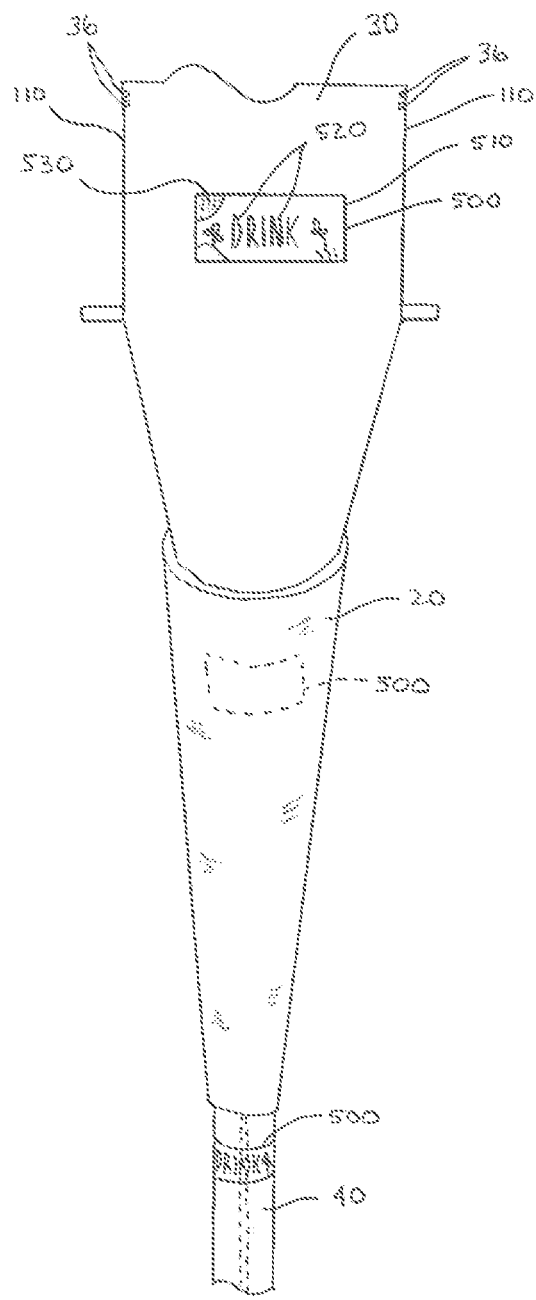
FIG. 2 is a drawing of a web having a label before and after feeding through a forming guide.

The web 30 can be provided with a label 500, as shown in FIG. 2. The label 500 can comprise a label substrate 510 and ink 520. The label can comprise foil. The label 500 can be adhered to the web 30 by an adhesive 530 between the label substrate 510 and the web 30. The label 500 can be thermal bonded to the web 30. The label 500 can be applied to the web 30 in a process that is continuous or intermittent with the process of transitioning the flat web 30 into the loose conduit 40. Optionally, the web 30 can be provided with the label 500 already applied thereto. That arrangement can decouple the process of applying the label 500 to the web 30 from the process of transitioning the flat web 30 into the loose conduit 40 and further converting into a finished container.

The web 30 can be provided with one or more registration marks 36 as is known in the art to aid with automated web control so that the web 30 is positioned properly during the operations performed to transform the web 30 into a container.

The label 500 can be positioned on the web 30 in any position as desired, accounting for deformation of the web 30 that occurs as the web 30 is transformed into loose conduit 40 and further converted into the finished container. The label 500 can cover less than about 50% of the surface of the web 30 that ultimately becomes the external surface finished container.

As shown in FIG. 2, the label includes text. The text is distortion printed so that when the container is blown the letters of the text have the proper height to width ratio. As shown in FIG. 2, each letter of the text is taller than it is wide. When the label 500 is stretched in the cross direction, each letter of the text will be stretched in the cross direction and the font of each letter will have the desired aspect ratio of height to width. Distortion printing is the printing of a scaled image or text on a label and then that label is controllably stretched in one or more directions so that the scaled image ends up being the desired image in terms of dimensions.

Figure 3:
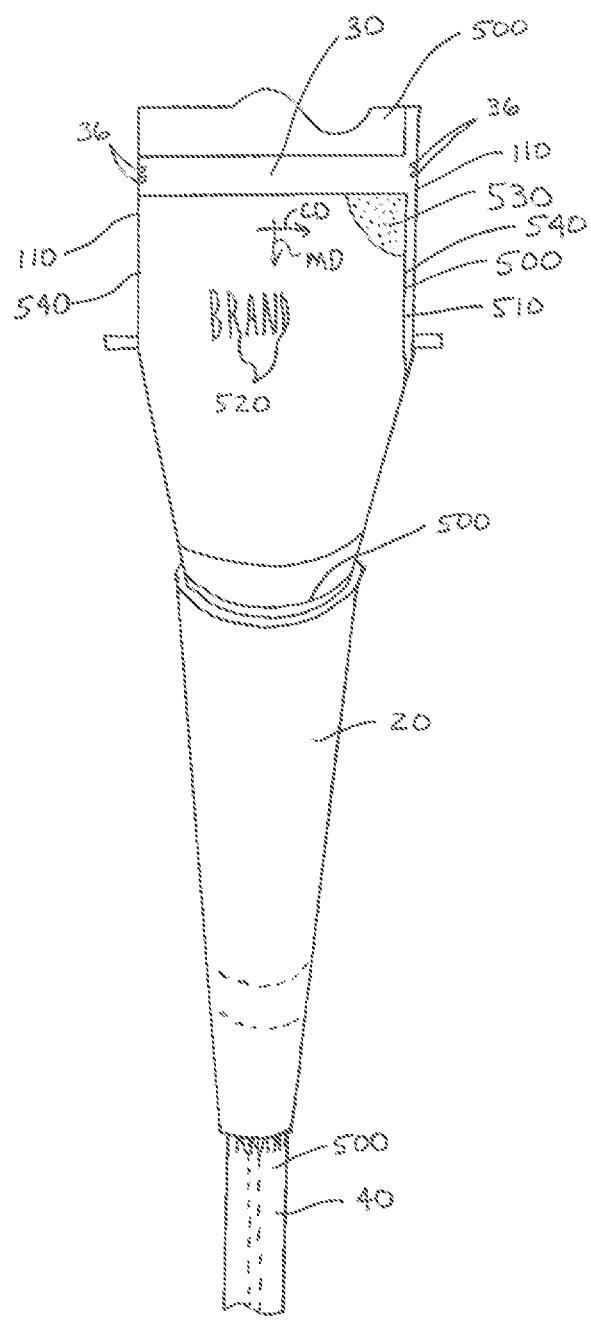
FIG. 3 is a drawing of a web having a label before and after feeding through a forming guide.

Optionally, the label 500 can be so extensive in the cross direction CD that that the label 500 extends about the entire periphery of the external surface of the finished container, by way of nonlimiting example as shown in FIG. 3. The label 500 in FIG. 3 is distortion printed, which is apparent by the letters appearing to be too skinny relative to their height. The label 500 can have a pair of label lateral edges 540 spaced apart from one another in the cross direction CD. One of the label lateral edges 540 can be coincident or substantially coincident with a web lateral edge 110. The other label lateral edge 540 can be spaced apart from the other web lateral edge 110. The label 500 can be so extensive in the machine direction MD that the label 500 extends onto the external surface of the closed end of the finished container. One or more labels 500 may be provided. And the label 500 or labels 500 may have any desired shape.

Figure 4:
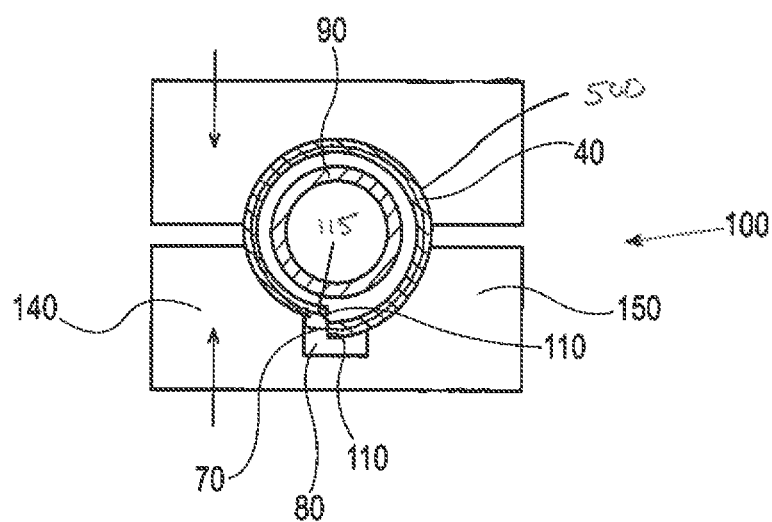
FIG. 4 is a drawing of the conformer in an open position.

The loose conduit 40 is fed into the conformer 100, as shown in FIG. 4. FIG. 4 is a top view of the conformer 100 in which the sections of the blowing cane 90 and loose conduit 40 are rendered. As shown in FIG. 4, the blowing cane 90 and loose conduit 40 fit within the conformer 100. The blowing cane 90 extends through the conformer 100 further down into the process. The loose conduit 40 is fed into the conformer 100 with the conformer 100 in an open position, as shown in FIG. 4 in which the first half 50 and second half 60 of the conformer 100 are in an open position. The conformer 100 comprises a first half 50 and a second half 60, the first half 50 and second half 60 being mounted about the blowing cane 90 and loose conduit 40. The first half 50 and second half 60 can translate towards and away from the blowing cane 90 and loose conduit 40. A hydraulic, lever, chain, or other mechanical system can be provided to translate the first half 50 and second half 60 of the conformer 100 towards and away from the blowing cane 90 and loose conduit 40. The second half 60 of the conformer 100 can be provided with an abutment 70 against which a lateral edge 110 of the loose conduit 40 can abut. As the loose conduit 40 is fed into the conformer 100, a lateral edge 110 of the loose conduit 40 can abut against the abutment 70 to true up lateral edges 110 of the loose conduit 40 with respect to one another so that the lateral edges 110 of the loose conduit 40 are parallel to one another and in an overlapping relationship with respect to one another.

If the label 500 is to extend about the entire periphery of the external surface of the finished container, the loose conduit 50 can be arranged so that the web lateral edge 110 of the web 40 that has a label lateral edge 540 coincident therewith or substantially coincident therewith is up against the abutment 70. The label 500 can extend from the web lateral edge 110 against the abutment 70 towards the opposing lateral edge 110 and leave a portion of the other web lateral edge 110 uncovered by the label 500. Arranged as such, the label 500 does not cover the web lateral edge 110 that slides past the abutment 70 when the conformer 100 is closed and a portion of the web 40 adjacent such lateral edge 110. The uncovered portion of the web 40 can be conveniently bonded to the internal surface 115 of web 40 near the web lateral edge 110 that has label 500 positioned there above, neither surface of which has the label 500 disposed thereon.

Figure 5:
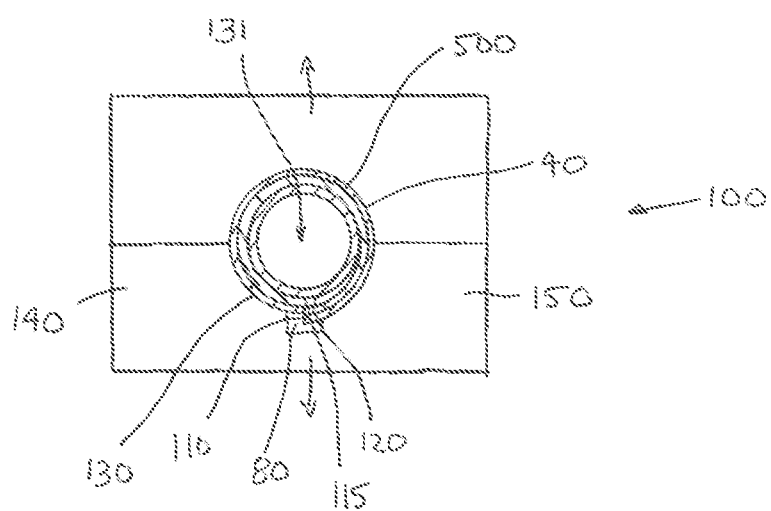
FIG. 5 is a drawing of the conformer in a closed position.

The conformer 100 can be provided with a bonding implement 80 proximal the abutment 70. The bonding implement 80 can be an ultrasonic bonding apparatus or thermal bonding apparatus. When the conformer 100 is in the closed position, the bonding implement 80 can bond an overlapping portion 120 of the loose conduit 40 to form the intermediate tube 130. The bonded overlapping portion 120 becomes the overlapping seam on the container. The intermediate tube 130 can be described as being like a hose having an overlapping seam extending along the length of the hose. The abutment 70 can extend through the conformer 100 and the abutment 70 can be parallel to the direction of movement of the loose conduit 40. Described otherwise, the abutment 70 can extend partially along or completely along the second half 60 of the conformer 100 orthogonal to the direction of translation of the first mold half 50 and or second mold half 60. The second mold half 60 of the conformer 100 can have a first quarter 140 and a second quarter 150 with the first quarter 140 and second quarter 150 offset with respect to one another at the abutment 70. The amount of the offset can be greater than or equal to the thickness of the web 30. Sized and dimensioned as such, when the conformer 100 is transitioned from the open position shown in FIG. 4 to the closed position as shown in FIG. 5, one edge of the loose conduit 40 can slide over or fit within the other edge of the loose conduit 40 so as to be in an overlapping relationship wherein the lateral edges 110 of the loose conduit are moved into an overlapping relationship such the lateral edges 110 are parallel to one another. The loose conduit 40 can have a cross section that is an approximately cylindrical shape.

The loose conduit 40 can have a cross section that is an approximately oval shape. The first mold half 50 and the second mold half 60, and the portions thereof that are the first quarter 140 and second quarter 150, can be shaped to provide the desired shape of the loose conduit 40 and ultimately the desired shape of the intermediate tube 130 that is formed when the conformer 100 is closed and the overlapping portion 120 is bonded. The intermediate tube 130 can have an intermediate tube open area 131 that is the interior cross sectional area of the intermediate tube 130 measured orthogonal to the machine direction. As shown in FIG. 5, the loose conduit 40 can have a cross section that is an approximately tubular shape. The actual shape of the loose conduit 40 is not critical so long as loose conduit can be positioned about the blowing cane 90. The loose conduit 40 can fit around the blowing cane 90 and can move along the length of the blowing cane 90 in the machine direction MD. The machine direction MD is the direction of travel of the web 30, loose conduit 40, intermediate tube 130, and container 200 in the process of making the container 200.

Figure 6:
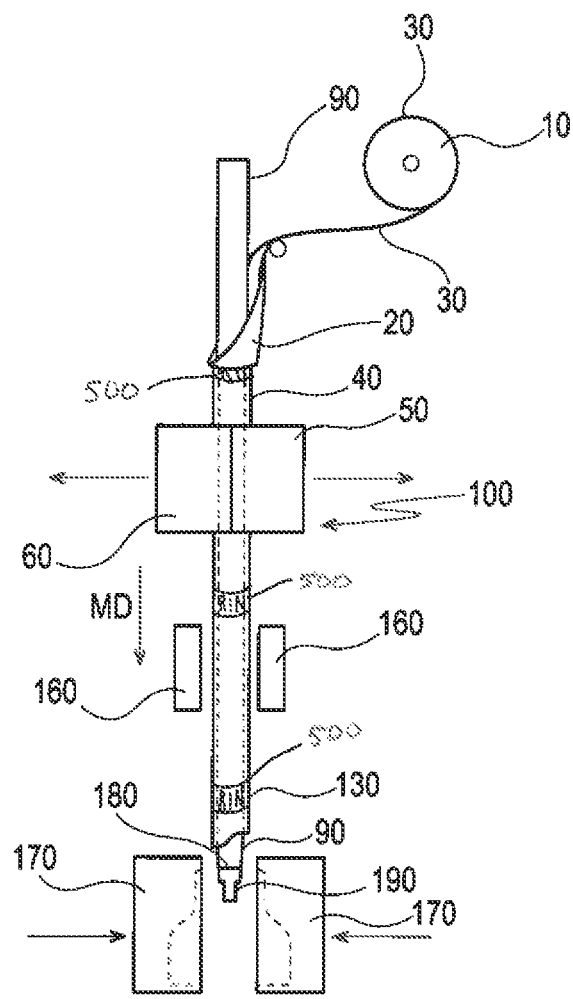
FIG. 6 is a drawing of an apparatus for forming a container.

After the intermediate tube 130 is formed, the intermediate tube 130 can pass through a pre-heater 160. The pre-heater 160 can heat the intermediate tube 130 such that when the intermediate tube 130 enters the blow mold 170, the intermediate tube 130 is at a temperature such that the preform, which is formed from the intermediate tube 130, can be blow molded into container. As shown in FIG. 6, the blowing cane 90 extends through the forming guide 20, loose conduit 40, conformer 100, and intermediate tube 130. The blowing cane 90 extends into the blow mold 170. The blowing cane 90 can provide gas, such as air to blow mold the finished container. The blow mold 170 defines a cavity into which the preform is blown to form the finished container. The cavity defined by the blow mold 170 can have the shape of the finished container. Blow molding is a thermoforming process that imparts certain physical attributes to the finished container. The blow mold 170 can be a heated blow mold 170.

Figure 7:
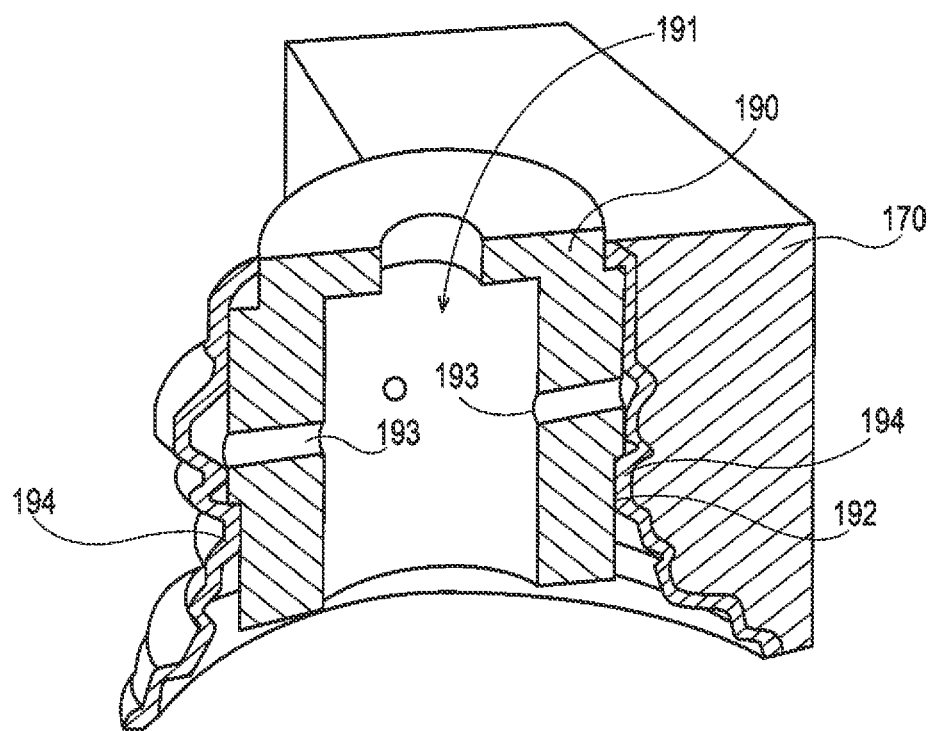
FIG. 7 is a partial view of a blow mold engaged with a calibration mandrel and a blown container.

A mandrel 192 extends from the blowing cane terminus 180. The mandrel 192 can be a calibration mandrel 190 if a calibrated neck is desired for the finished container. The mandrel 192 or calibration mandrel 190 can be used to define the open end of the container. A cross section of a calibration mandrel 190 is shown in FIG. 7. The calibration mandrel 190 has an interior portion 191 and a bearing surface 192. The interior portion 191 is in fluid communication with the blowing cane 90 and comprises one or more ports 193 in fluid communication with the interior portion 191.

Figure 8:
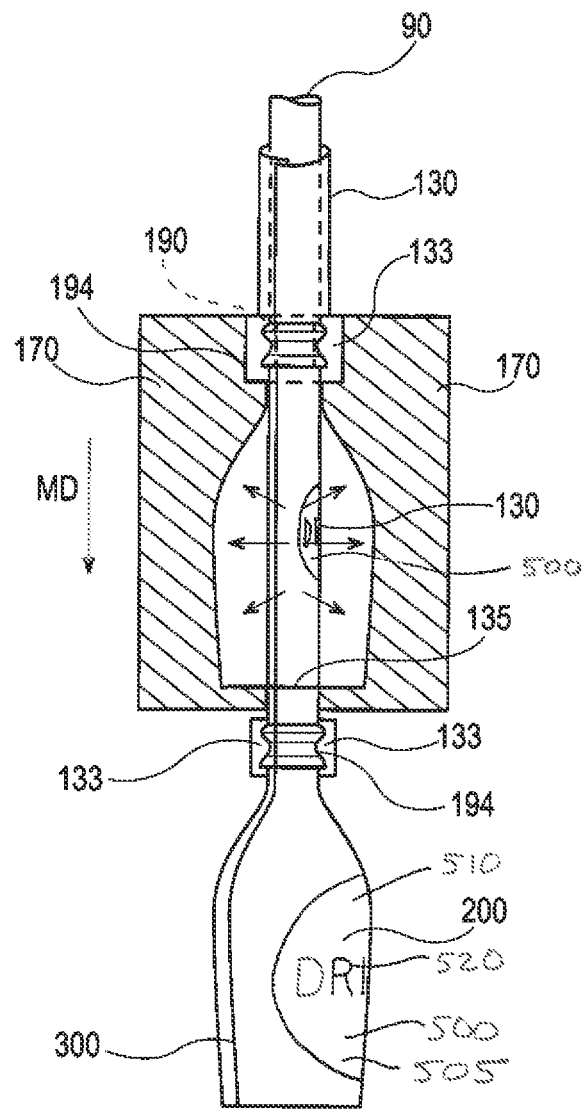
FIG. 8 cutaway view of an intermediate tube in a closed blow mold.

The intermediate tube 130 can be advanced over the blowing cane 90 and mandrel 192, or calibration mandrel 190 if provided, that is attached to the blowing cane 90. Once the intermediate tube 130 is in the blow molding position, the halves of the blow mold 170 close upon the intermediate tube 130. The blow mold 170 encloses a portion of the intermediate tube 130 and conforms at least a portion of the intermediate tube 130 to at least a portion of the mandrel 192, or calibration mandrel 190 if provided, as shown in FIG. 8. The intermediate tube 130 fits over the mandrel 192, or calibration mandrel 190 if provided, as the intermediate tube 130 moves in the machine direction MD. When the blow mold 170 closes about the intermediate tube 130, the blow mold 170 conforms the portion of the intermediate tube 130 that will define the open end of the container to mandrel 192, or the calibration mandrel 190 if provided.

If a calibration mandrel 190 is used, since the intermediate tube 130 loosely fits over the calibration mandrel 190, there is an excess of material that arises as the blow mold 170 closes upon the intermediate tube 130 and conforms the intermediate tube 130 to the calibration mandrel 190. The excess of material yields two flashings 133 proximal the location where the halves of the blow mold 170 meet. The amount of material in the flashing roughly corresponds with the amount of the intermediate tube 130 that can be eliminated so as to yield an open end of the container that has an open area orthogonal to the machine direction MD less than open area of the intermediate tube in that same direction. Thus, employing the calibration mandrel 190 as such allows the preform, which is formed from the intermediate tube 130, to be formed into a container having an open end that has a smaller open area orthogonal to the machine direction MD than the open area of the preform or intermediate tube 130 orthogonal to the machine direction MD. Without employing a calibration mandrel 190, the open end has the same or greater open area orthogonal to the machine direction MD as the open area of the intermediate tube 130 orthogonal to the machine direction MD. Such a container design may not be practical for containers having a narrow open end, such as a toothpaste tube.

As the halves of the blow mold 170 close upon the intermediate tube 130, the blow mold halves apply bearing pressure to the bonded overlapping portion 120 of the intermediate tube 130 against the underlying mandrel 192 or calibration mandrel 190 to form the neck 194 and compress out the overlapping portion 120 so that the overlapping portion 120 that subsequently becomes the overlapping portion of the container in the neck portion of the container is not as defined as the overlapping portion 120 of the intermediate tube 130 prior to passing through the blow mold 170 or the overlapping portion 120 that ends up forming the overlapping seam of the container. The neck 194 can be a calibrated neck.

The intermediate tube 130 is closed at a pinch seam 135 formed where the halves of the blow mold 170 close at the bottom of the blow mold 170, with that portion of the intermediate tube 130 ultimately becoming the closed end of the container 200.

As shown in FIG. 8, the text on the label 500 in the blown container 200 has an appropriate height to width ratio of the characters, as opposed to the label 500 in the blow mold 170 prior to blowing, which has characters that are too skinny relative to their height.

Figure 9:
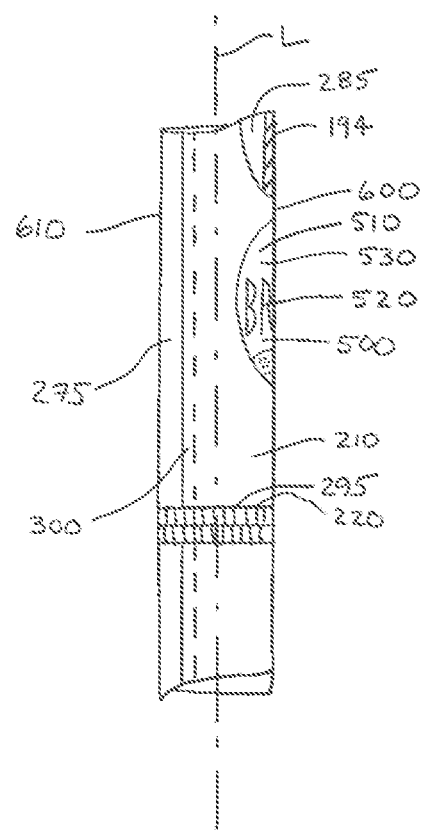
FIG. 9 is a preform having a label.

Once the pinch seam 135 is formed, the preform 600 for making the container is established (FIG. 9). The preform 600 has a closed end 220. A preform wall 610 extends longitudinally from the closed end 220 about a longitudinal axis L. The preform wall 610 has an external surface 275 that is outwardly oriented and an opposing internal surface 285. The preform 600 has an end seam 295 (pinch seam 135) extending across the closed end 220. The preform 600 has a longitudinal overlapping seam 300 extending along the preform wall 610 from the end seam 295. The preform 600 can further comprise a label 500 bonded to the external surface 275. The label 500 can be bonded to the external surface 275 by an adhesive 530, thermal bonded to the external surface 275, or otherwise bonded to the external surface 275. The label 500 can comprise a label substrate 510 and ink 520 disposed on the label substrate 510. A common one-piece thermoplastic substrate 210 forms both the closed end 220 and the preform wall 610. The preform 600 can be considered to have a neck 194 opposing the closed end 220. The neck 194 of the preform may have the same cross section shape as the preform 600 below the neck 194. The neck 194 of the preform is the part of the preform that ultimately becomes the neck 194 of the container 200. The preform wall 610 can extend longitudinally between the closed end 220 and the neck 194. Further, the longitudinal overlapping seam 300 can extend along the preform wall 610 from the end seam 295 to the neck 194, the neck being proximal the open end 230.

Figure 10:
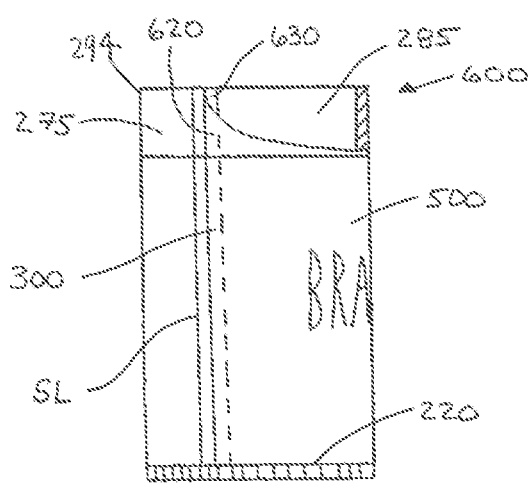
FIG. 10 is a preform having a label.

If the preform 600 is provided as an individual preform 600, the preform 600 has an open end 230 opposing the closed end 220. The preform wall 610 extends longitudinally between the closed end 220 and the open end 230 about a longitudinal axis L. The preform 600 has a longitudinal overlapping seam 300 extending along the preform wall 610 from the end seam 295 to the open end 230. A preform 600 that has a label 500 extending about the entire periphery at some location along the preform 600 is shown in FIG. 10. As shown in FIG. 10, the overlapping seam 300 can comprise an outer portion 620 that is part of the external surface 275 of the preform 600 and an underlying inner portion 630. The outer portion 620 can comprise the label 500 and the inner portion 630 can be devoid of the label 500. Arranged as such, the label 500 does not end up being between the outer portion 620 and inner portion 630 of the overlapping seam 300. That can simplify bonding the outer portion 620 to the inner portion 630 when forming the intermediate tube 130 and ultimately provide for a structurally robust finished container 200 that does not fail along the overlapping seam 300 during intended use.

If the label 500 is desired to be part of the closed end 220 of the finished container, the label 500 can extend onto the closed end 220 of the preform 600. The label 500 can extend from the closed end 220 of the preform 600 towards the open end 230 of the preform 600. Since the label 500 is on the external surface 275 of the intermediate tube 130 and the closed end 220 of the preform 600 is formed by pinching the intermediate tube 130, the label will not interfere with the end seam 295.

The overlapping seam 300 of the preform 600 can be considered to have an overlapping seam length SL measured from the end seam 295 along the preform 600 to the neck 194 of the preform 600. The label 500 can cover from about 80% to about 100% of the overlapping seam length SL.

Blowing air or gas, optionally heated or cooled, is blown into the preform 600 below the mandrel 192, or calibration mandrel 190 if provided, and blows out the preform 600 into conformance with the halves of the blow mold 170. Prior to, during, or after blow molding the container 200, the blow mold 170, blowing cane 90, and mandrel 192, or calibration mandrel 190 if provided, can move in the machine direction MD to pull the preform 600, intermediate tube 130, loose conduit 40, and web 30 along in the machine direction MD to advance the process in an indexed manner.

After the container 200 is blow molded and advanced, the blow mold 170 can be opened. Then the blow mold 170 and the mandrel 192, or calibration mandrel 190 if provided, can be moved upstream relative to the machine direction MD. Once the blow mold 170 and mandrel 192, or calibration mandrel 190 if provided, are in the proper position, the blow mold 170 can be closed upon the next portion of the intermediate tube 130 and the steps repeated to form another container 200.

Figure 11:
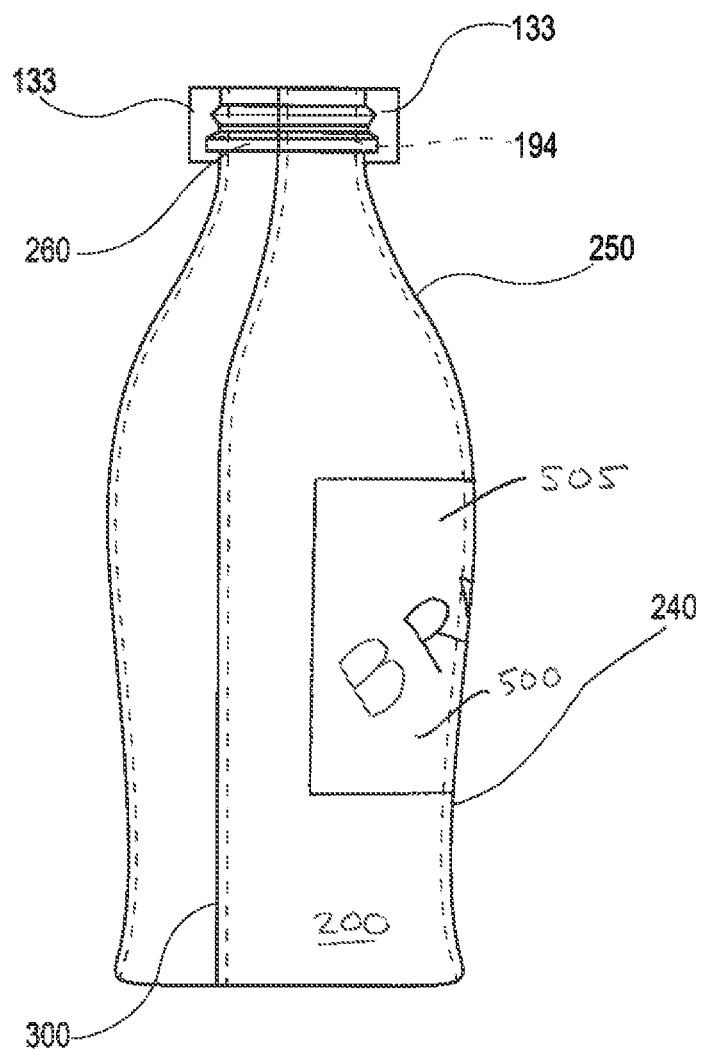
FIG. 11 is side view of a container after blow molding.
Figure 12:
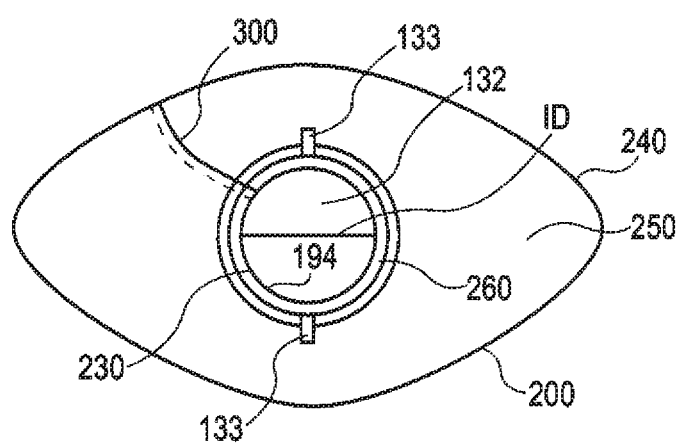
FIG. 12 is a top view of a container showing the open end.

The finished container 200 can be cut from the material upstream of the finished container 200. The cut can be made at or slightly above the neck 194 to leave the neck 194 and other portions of the container 200 intact. If a calibrated neck 194 is provided by employing a calibration mandrel 190, any resulting flashings 133 can be removed from the container 200 via a cutting or breaking operation or removed by hand. A side view of a container 200 in which the flashings 133 are still attached to the container 200 in the neck portion 260 proximal the open end 230 is shown in FIG. 11. The flashings 133 can be thin fin protrusions extending away from the neck portion 260. Stated otherwise, the neck portion 260 can comprise two longitudinally extending flashings 133 projecting away from the longitudinal axis L on opposite sides of the neck portion 260. The neck portion 260 is proximal the open end 230. A top view of a container 200 in which the flashings 133 are still attached to the container 200 in the neck portion 260 proximal the open end 230 is shown in FIG. 12. The inside diameter ID is illustrated in FIG. 12. The calibrated neck 194 can have a calibrated neck open area 132, the open area measured orthogonal to the longitudinal axis L of the container 200. The longitudinal axis L of the container 200 pass through the center of the open end 230. Since in making the container 200 with a calibrated neck 194 the intermediate tube 130 is forced into the calibration mandrel 190 to form the calibrated neck 194, the calibrated neck open area 132 is less than the intermediate tube open area 131.

Figure 13:
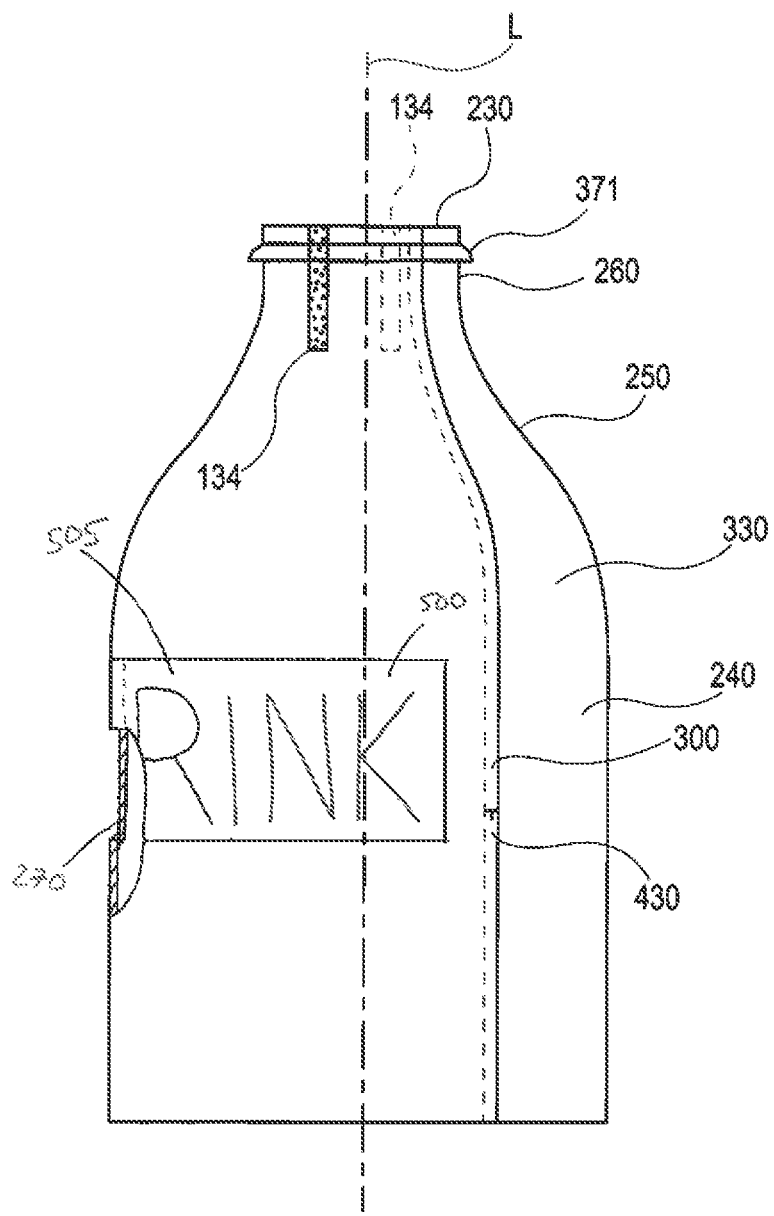
FIG. 13 is side view of a container after blow molding.

At the locations where the flashings 133 are removed from the container 200, two partially longitudinally extending flashing lines 134 can remain as evidence of the prior existence of the flashings 133, as shown in FIG. 13. As the preform 600 is blown to form the finished container 200, the label 500 on the preform 600 is stretched and becomes a stretched label 505. The adhesive 530 and label 500 on the preform 600 deform in concert with the portion of the preform 600 to which the adhesive 530 and label 500 are affixed. Thus, the stretched label 505 is affixed to the external surface 275 of the container 200 by the adhesive 530, the adhesive 530 also being stretched. Since the stretched label 505 is the same material as the label 500, only transformed by stretching, the stretched label 505 also comprises the label substrate 510 and ink 520.

A conceptually similar approach for forming a container 200 from a flat web 30 or a flat sheet that can be found in US20190070766 A1, which is hereby incorporated by reference in its entirety. A flat web 30 or flat sheet having an Opacity less than about 50% when conformed to the mold and employing a thermal bond to form the overlapping seam 300 can be employed.

The stretched label 505 can be a least partially embedded in the container 200, by way of nonlimiting example as shown in FIG. 13. The stretched label 505 can become embedded in the container wall 270 as the container wall 270 is pressed up against the mold surface interior of the mold 170 and the portion of the container wall 270 immediately around the stretched label 505 is also pressed up against the mold surface interior of the mold 170. Blow molding may take place at a temperature at which the constituent material forming the container wall 270 can flow. As the portion of the container wall 270 that has the stretched label 505 adhered thereto contacts the mold surface of the interior of the mold 170, the portion of the container wall 270 immediately around the stretched label can deform to conform to the interior of the mold 170. This is the same phenomena that can occur when in-mold labeling is employed to label extrusion blow molded containers or injection blow molded containers. This can result in smooth or substantially smooth boundary between the stretched label 505 and the container wall 270 adjacent the stretched label, which can help reduce the potential for scuffing of the stretched label 505 and provide for a high quality finished look.

Figure 14:
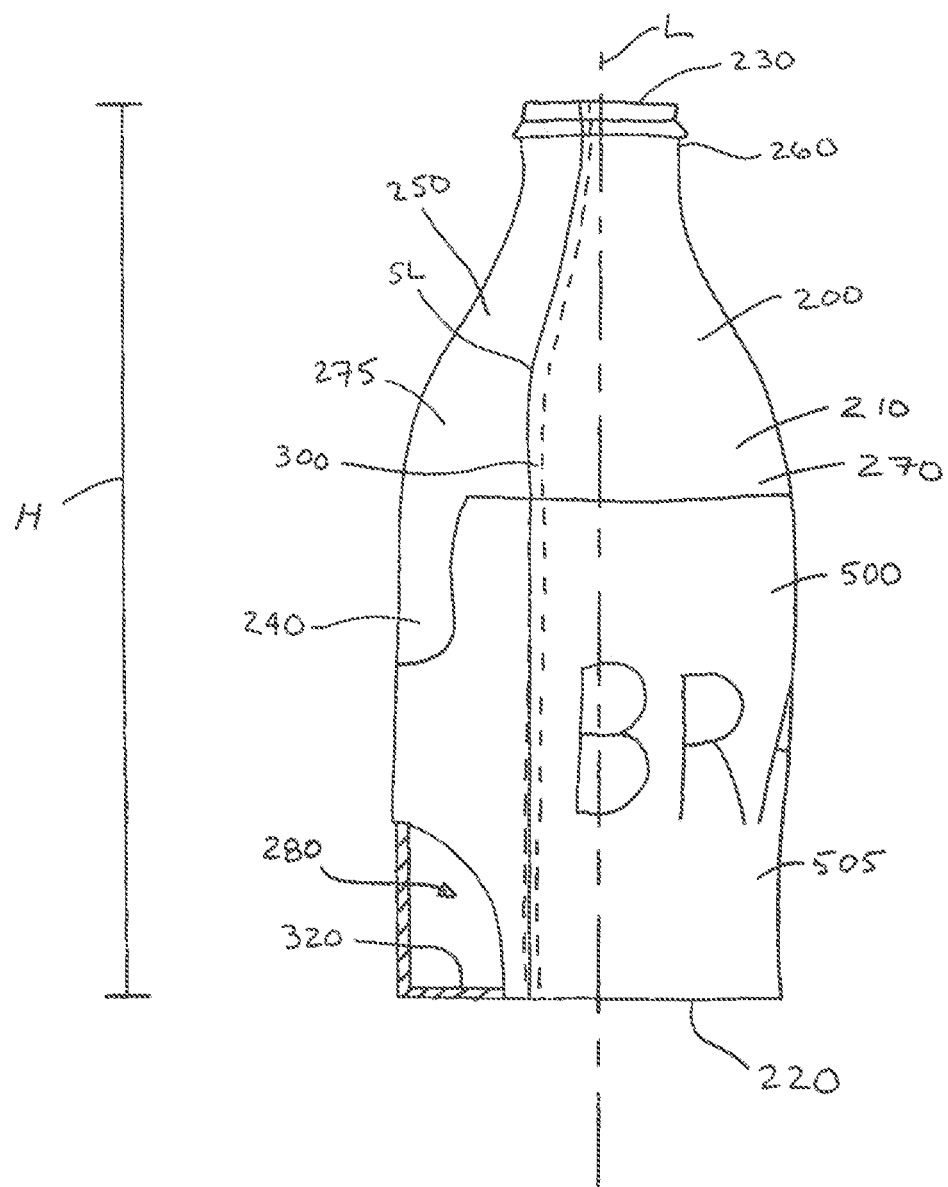
FIG. 14 is a drawing of a container, a portion of which is rendered in a section view to show the interior volume and interior surface of the container.

The container wall 270 can be considered to have an interior surface 320 defining the interior volume 280 of the container and an external surface 275 opposing the interior surface (FIG. 14). Each of the main body portion 240, shoulder portion 250, and neck portion 260 can be considered to have an interior surface 320 and an external surface 275. The interior surface 320 can be oriented towards the longitudinal axis L and the external surface 275 can be oriented away from the longitudinal axis L.

With respect to the overlapping seam 300, the overlapping seam 300 can comprise an outer portion 302 that is part of the external surface 275 of the container 200 and an underlying inner portion 301, both the outer portion 302 and the inner portion 301 oriented away from the interior volume 280. The outer portion 302 can comprise the stretched label 505 and the inner portion 302 can be devoid of the stretched label 505. Such an arrangement is practical to avoid having the stretched label 505 interfere with formation and integrity of the overlapping seam 300.

The stretched label 505 can cover part of the overlapping seam 300. Optionally the stretched label can extend about the entire periphery of the container 200 at positions along the longitudinal axis L, the periphery being taken orthogonal to the longitudinal axis L. Such an arrangement can help to obscure the overlapping seam 300 from view to provide for a finished look to the container 200. The overlapping seam 300 can have an overlapping seam length SL measured from end seam 295 to the open end 230 of the container 200. The stretched label 505 can cover more than about 80% of the overlapping seam length SL. Such an arrangement can help to obscure the overlapping seam 300 from view of the user of the container 200.

Figure 15:
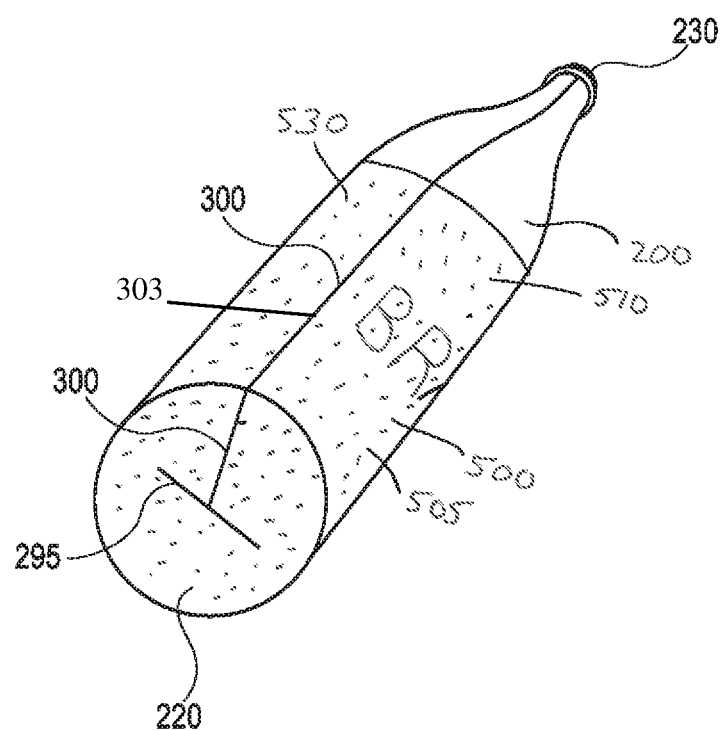
FIG. 15 is perspective view of container in which the closed end of the container is visible.

A perspective view of a container 200 showing the closed end 220 is shown in FIG. 15. As shown in FIG. 15, the container 200 can comprise an end seam 295 extending at least partially across the closed end 220 of the container. The end seam 295 can arise when the blow mold 170 is closed upon the intermediate tube 130. At that stage of the process the end seam 295 extends across the intermediate tube 130 to form the preform 600. Then the preform 600 is blown up to form the container 200. A portion of the closed end 220 of the container 200 can be formed of material that was formerly part of the preform wall 610 of the preform 600. An adhesive 530 can optionally be present between the label and the container wall 270.

The container 200 can further comprise a longitudinal overlapping seam 300 extending from the end seam 295. The longitudinal overlapping seam 300 can extend from any portion of the overlapping seam 200, for instance at one of the ends of the end seam 295 or at any location between ends of the end seam 295. A portion of the longitudinal overlapping seam 300 can extend longitudinally along the container wall 270 between the closed end 220 to the neck portion 260 of the container. This might occur if in the neck portion 260 the bonded overlapping portion 120 of the intermediate tube 130 ends up being part of flashing 133. A portion of the longitudinal overlapping seam 300 can extend longitudinally along the container wall 270 between the closed end 220 and the open end 230 of the container. This can occur if a calibrated neck 194 is not formed or in the case in which a calibrated neck 194 is formed and the bonded overlapping portion 120 of the intermediate tube 130 does not end up being part of the flashing 133.

The overlapping seam 300 can arise in the finished container 200 as a result of the conformer 100 closing upon loose conduit 40 in the process of forming the intermediate tube 130. The overlapping seam 300 can comprise a thermal bond 303. The end seam 295 extending at least partially across the closed end 220 of the container can be a smoothed out pinch seam 135. That is the end seam 295 may be substantially smooth after a pinch seam 135 is formed in the intermediate tube 130 and the preform 600 is then deformed by blow molding to form the closed end 220 of the container.

The stretched label 505 can extend onto the closed end 220, as shown in in FIG. 15. That can be provided for by applying the label 500 all the way or most of the way to the closed end 220 of the preform 600. Including the stretched label 505 on the closed end 220 of the container 200 can simplify placement of the label 505 on the preform 600 since the longitudinal position of the label 500 on the preform may not need not be precisely controlled. Further, arranged as such, the bottom of the container 200 can be labeled or the label 505 can make the contents of the container 200 not visible or only partially visible from outside the container 200 and can help to prevent light from entering the container 200 that might spoil the contents therein.

A common one-piece thermoplastic substrate 210 can form both the closed end 220 and the container wall 270. That is, the closed end 220 and the container wall 270 are comprised of a common one-piece thermoplastic substrate 210. Stated otherwise, the closed end 220 and the container wall 270 are comprised of a common one-piece thermoplastic substrate 210. The closed end 220 and the container wall 270 being a unitary one-piece thermoplastic substrate 210 arises as the web 30 is transformed from a flat web to a three-dimensional shape. Stated otherwise, the closed end 220 and the container wall 270 can consist of or comprise a one-piece thermoplastic substrate 210. That is, together, the closed end 220 and the container wall 270 can be formed from a single portion of web 30 that is shaped into a structure that is subsequently blow molded into a container 200. Stated otherwise, the container 200 can be described as being free from seams other than a seam extending at least partially across the closed end 220 and an overlapping seam 300 extending from the end seam 295, a portion of the overlapping seam 300 extending longitudinally along the container wall 270 between the closed end 220 and the open end 230. This construction of the container 200, in which the entire neck portion 260, shoulder portion 250, container wall 270, and closed end 220 are formed of a single integral substrate is practical in that the manufacturer is not required to assemble different parts of the container. This is unlike the construction of containers such as toothpaste tubes that are presently in the market in which the shoulder portion 250 and neck portion 260 are typically formed from an injection molded plastic insert that is bonded to the container wall 270 that is formed from a flexible substrate.

It is also thought that by having the shoulder portion 250 and container wall 270 formed of a single integral substrate that there is less potential for a leak to occur at such location since there is no potential for a leaky bond between the shoulder portion 250 and the container wall 270. Stated otherwise, the juncture between the shoulder portion 250 and the container wall 270 can be free from a seam. Further, the juncture between the neck portion 260 and the shoulder portion 250 can be free from a seam forming the juncture. Further, the juncture between the shoulder portion 250 and the container wall 270 can be free from a seam forming the juncture.

Since the closed end 220 and container wall 270 consist of or are comprised of a single portion of web 30, the end seam 295 across at least a portion of the closed end 220 of the container extends to or connects to overlapping seam 300 extending longitudinally along the container wall 270. As such, the overlapping seam 300 can be continuous across the boundary between the closed end 220 and container wall 270. The overlapping seam 300 can extend along the height H of the container 200. The height H of the container extends between the closed end 220 and the open end 230.

Figure 16:
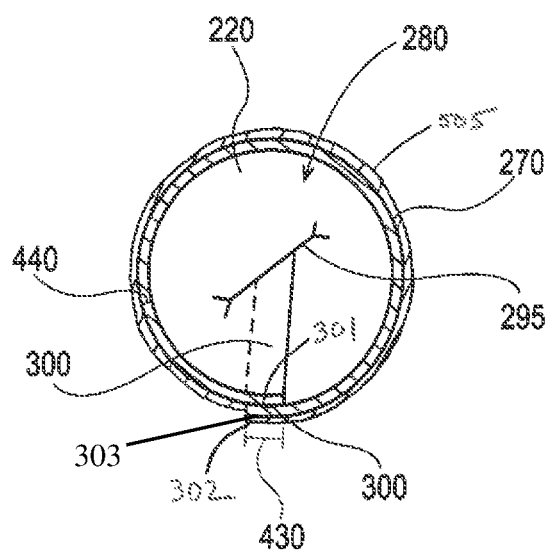
FIG. 16 is a cross section of a container.

A cross section of a container 200 is shown in FIG. 16, the view being taken to show the closed end 220. As shown in FIG. 16, the overlapping seam 300 can extend across part of the closed end 220. The overlapping seam 300 across part of the closed end 220 can be connected to the end seam 295. As shown in FIGS. 15 and 16, the overlapping seam 300 can extend from the end seam 295 across part of the closed end 220 of the container to the container wall 270 and longitudinally along the container wall 270 between the closed end 220 and open end 230. Stated otherwise, a portion of the longitudinal overlapping seam 300 can extend longitudinally along the container wall 270 between the closed end 220 and the open end 230 of the container and between the container wall 270 and the end seam 295. As such, the container 200 can comprise an overlapping seam 300 that is connected to the end seam 295 and extends partially across the closed end 220 of the container and longitudinally along at least part of the container wall 270 between the closed end 220 and the open end 230.

As shown in FIG. 16, at about 10% of the height away from the closed end 220 of the container 200, height being the straight line height between the closed end 220 and open end 230 parallel to the longitudinal axis L, the overlapping seam 300 along the container wall 270 has an overlap magnitude 430 of more than about 1.5 times the thickness 440 of the container wall 270 as measured at a distance from the overlapping seam 300 equal to the magnitude of overlap 430. As a result of blow molding to form the container 200, the container 200 can have a variety of thicknesses at different locations on the container. For example, the thickness of the container wall 270 in the main body portion 240 may be different from the thickness of the closed end 220, shoulder portion 250, and neck portion 260. The overlap magnitude 430 may vary at different locations along the overlapping seam 300 along the height H of the container 200. To provide for a common location at which to measure the overlap magnitude 430 regardless of height H of the container 200, the comparison of the overlap magnitude 430 can be taken at a location about 10% of the height H away from the closed end 220 of the container 200. Without being bound by theory, it is thought that a representative measure of thickness of the container wall 270 can be taken at a distance from the overlapping seam equal to the overlap magnitude 430.

Such location is relatively near the seam but yet not so far from the overlapping seam 300 so as to be at a completely different part of the container 200, such as at a handle, if present, or some other decorative or functional part of the container 200. Further, thickness of the container wall 270 at the overlapping seam 300 along the height H of the container may vary as a function of location. Greater overlap might be measured at the maximum axial dimension of the container 200 as compared to the shoulder portion 250 or neck portion 260 since that portion of the container is stretched more during formation of the container 200 than the shoulder portion 250 or neck portion 260. The overlapping seam 300 at a location about 10% of the height away from the closed end 220 can be thicker than any other portion of the container wall 270 at a location about 10% of the height away from the closed end 220 of the container 200.

Figure 17:
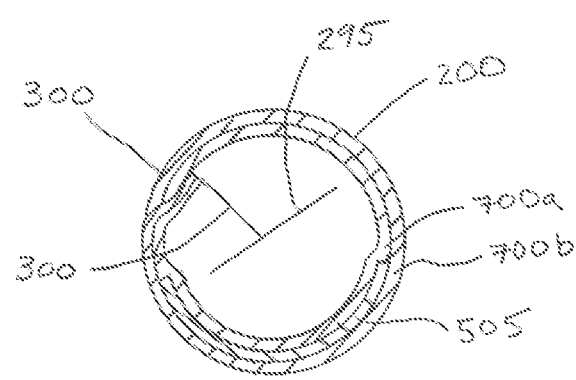
FIG. 17 is a cross section of a container in which the stretched label is between two layers.

The container wall 270 can comprise two layers 700a and 700b, as shown in FIG. 17. The stretched label 505 can be between the two layers 700a and 700b. The overlying layer and any additional layers towards the external surface 275 can be translucent or clear so that the stretched label 505 is visible to an observer of the external surface 275. Such an arrangement can provide the benefit of protecting the stretched label 505 from scuffing. Further, placing the stretched label 500 beneath a layer or layers of translucent material can provide for an enhanced visual appeal. To end up with a container in which the stretched label 505 is between two layers 700a and 700b, the label 500 can be applied to one of the layers 700a or 700b and then the other layer 700a or 700b can be laminated to the layer 700a or 700b to which the label 500 is bonded.

The closed end 220 can be sized and dimensioned so that the container 200 is free standing on the closed end 220. The thermoplastic substrate can comprise a composition selected from the group consisting of polyethylene terephthalate, polystyrene, polypropylene, polyethylene, polyvinyl chloride, nylon, ethyl vinyl alcohol, and mixtures thereof. The container 200 can have a height H extending between the closed end 220 and the open end 230 and the container wall 270 can have a thickness away from the overlapping seam 300, wherein at a location about 10% of the height H away from the closed end 220 the overlapping seam 300 along the container wall 270 has an overlap magnitude of more than about 1.5 times the thickness of the container wall 270 as measured at a distance from the overlapping seam 300 equal to the overlap magnitude. The container 200 can have a height H extending between the open end 230 and the closed end 220 and the container wall 270 has a thickness away from the overlapping seam 300, wherein the overlapping seam 300 at a location about 10% of the height H away from the closed end 220 is thicker than any other portion of the container wall 270 at a location about 10% of the height H away from the closed end 220. The open end 230 can be threaded. The open end 230 can be threaded on an outer surface of the open end 230. The open end 230 can be threaded on an inner surface of the open end 230. The neck portion 260 can comprise two longitudinally extending flashings 133 projecting away from the longitudinal axis L on opposite sides of the neck portion 260.

At a position along the overlapping seam 300, container wall 270 can have an overlap magnitude 430. At that position along the overlapping seam 300 at a location that is five times the overlap magnitude away from the overlapping seam 300, the container wall 270 can have a container wall 270 Opacity less than about 50%. An Opacity less than about 50% can provide for a container wall that is sufficiently translucent for the consumer to be able to see the contents within the container 200. The lower the Opacity of the container wall 270, the clearer the container wall 27. An Opacity of the container wall 270 less than about 25% or even less than about 15% can be perceived by consumers as clear.

At the position along the overlapping seam 300 off of which the Opacity of the container wall 270 is determined, the overlapping seam can have a seam Opacity that is less than 200% of the container wall Opacity. Such an overlapping seam 300 may not be so visible as compared to the container wall 270 that the consumer pays particular notice to it. Further, the contents of the container 200 may still be suitably visible through such an overlapping seam 300. The Opacity of the overlapping seam 300 can be less than 175% or even less than 150% of the container wall Opacity 270. The smaller the relative difference in Opacity between the container wall 270 away from the overlapping seam 300 and the overlapping seam 300, the less noticeable the overlapping seam 300 may be to the consumer. By maintaining a relatively small difference between the Opacity of the container wall 270 and the overlapping seam 300 in combination with the container wall 270 having an Opacity less than about 50% the consumer may be able to see the contents of the container 200 and not notice the presence of the overlapping seam 300. Further, since the container 200 may have an overall uniform appearance, the designer of the container 200 has more options for positioning labeling for the container 200, regardless of the type of label employed.

It is surprising and unexpected that the Opacity of the overlapping seam 300 can be less than 200% of the container wall Opacity. The overlapping seam 300 can comprise 2 layers of the constituent material of the container wall 270. Thus, one would expect that the Opacity of the overlapping seam would be at least 200% of the container wall Opacity since the overlapping seam 300 would be expected to be twice as thick as the container wall 270 away from the overlapping seam 300. An even higher difference in Opacity might occur if the constituent material of the container wall 270 is disturbed in some way when the overlapping seam 300 is formed. An overlapping seam 300 having an Opacity less than 200% of the container wall Opacity can be provided by forming the overlapping seam 300 with a thermal bond 303.

Containers 200 were formed using the processes described herein and the Opacity of the center of the overlapping seam 300 and the container wall 270 opposite the overlapping seam 300 were measured. Opacity was measured using the method as described below. Six containers 200 were evaluated.

The containers 200 evaluated had a 35 mm square footprint and were 73.5 mm tall from the foot to the shoulder of the container 200. The overlapping seam 300 was formed using ultrasonic bonding in which 100 to 500 J of power and 600 to 2000 Watts was imparted. The weld time was 0.3 to 2 s. The weld force was from 2 to 5 bar on a 50 mm cylinder across a 200 mm seal head. The horn amplitude was not recorded. The containers 200 were blown at a pressure from 100 to 800 kPa. The blowing temperature, depended on the container material, and was 115 C to 215 C for polypropylene materials. The blow time was 0.5 to 5 s.

Results of the evaluation are shown in Table 1.

TABLE 1

Results of Evaluation of Opacity of Container Wall and Opacity of Overlapping Seam.

| Container Wall Material | Opacity of Container Wall | Opacity of Overlapping Seam | Average Opacity of Container Wall | Average Opacity of Overlapping Seam | Average Opacity of Seam Compared to Average Opacity of Container Wall |
|---|---|---|---|---|---|
| Polypropylene homopolymer | 19% | 37% | 18% | 38% | 211% |
|  | 18% | 38% |  |  |  |
|  | 17% | 39% |  |  |  |
| 100% High Density Polyethylene | 22% | 40% | 26% | 41% | 156% |
|  | 21% | 40% |  |  |  |
|  | 36% | 43% |  |  |  |
| Polystyrene | 36% | 58% | 39% | 57% | 145% |
|  | 42% | 57% |  |  |  |
|  | 39% | 55% |  |  |  |
| Polypropylene-Clarified Random Co-Polymer (specimen A) | 7% | 12% | 8% | 12% | 150% |
|  | 9% | 11% |  |  |  |
|  | 8% | 13% |  |  |  |

TABLE 1-continued

Results of Evaluation of Opacity of Container Wall and Opacity of Overlapping Seam.

| Container Wall Material | Opacity of Container Wall | Opacity of Overlapping Seam | Average Opacity of Container Wall | Average Opacity of Overlapping Seam | Average Opacity of Seam Compared to Average Opacity of Container Wall |
|---|---|---|---|---|---|
| Polypropylene-Clarified Random Co-Polymer (specimen B) | 10% | 20% | 10% | 19% | 187% |
| | 11% | 16% | | | |
| | 9% | 20% | | | |
| Polyethylene Terephthalate Glycol | 3% | 5% | 4% | 6% | 155% |
| | 4% | 6% | | | |
| | 4% | 6% | | | |

Based on a visual inspection of the containers 200 formed, containers 200 having a container wall Opacity less than about 50% and a seam Opacity less than 200% of the container wall Opacity were satisfactorily translucent or clear so that the contents of the container 200 would be expected to be able to be observed through the overlapping seam 300 and container wall 270.

The thickness of the container wall 270 and overlapping seam 300 was also measured and is reported in Table 2, the location of the thickness measurements were not necessarily the same as the locations at which Opacity was measured.

TABLE 2

Thickness of the container wall 270 and overlapping seam 300.

| Container Wall Material | Thickness of Container Wall (mm) | Thickness of Overlapping Seam (mm) |
|---|---|---|
| Polypropylene homopolymer | 0.63 | 1.60 |
| 100% High Density Polyethylene | 0.70 | 1.13 |
| Polystyrene | 0.50 | 1.13 |
| Polypropylene-Clarified Random Co-Polymer (specimen A) | 0.75 | 1.55 |
| Polypropylene-Clarified Random Co-Polymer (specimen B) | 0.55 | 0.94 |
| Polyethylene Terephthalate Glycol | 0.52 | 0.90 |

Opacity is determined as follows. Optical Density is measured on regions cut from the article using a transmission densitometer with a 3 mm diameter aperture such as the X-rite 341 (X-Rite Inc, Grand Rapids, Mich.) or equivalent. The Optical Density is used to calculate % Opacity. The instrument is calibrated and operated according to the Operator's Guide. Before use, the null (zero) is established without any sample inserted into device and calibration is confirmed using a 5-step NIST certified calibration wedge (e.g. part no: 301-37, X-Rite Inc) or equivalent.

Two specimens approximately 3 cm square are cut from an article such that the edges are parallel and perpendicular to the seam. The first specimen is a region that contains the seam (S) and the second specimen is a region that does not contain a seam (NS). For specimen S, take three measures centered on the seam, distributed along the length of the seam, and record the optical density to the nearest 0.01 units. For specimen NS, take three measures, distributed along the length of the specimen, and record the density to the nearest 0.01 units.

Calculate the % Opacity for each averaged specimen as:

$$\% \text{ Opacity} = (1 - 10^{-D}) \times 100$$

where D is the optical density, and report for Seam (S) and No Seam (NS) specimens to the nearest percent. Average the % Opacity for each set of the three readings, for both Seam (S) and No Seam (NS) specimens to calculate the Average Opacity for the Seam (S) and No Seam (NS).

Combinations:

An example is below:
  A. A container (200) comprising:
    an open end (230);
    a closed end (220) opposing said open end;
    a container wall (270) extending longitudinally between said closed end and said open end about a longitudinal axis (L);
    an end seam (295) extending at least partially across said closed end; and
    a longitudinal overlapping seam (300) extending from said end seam, a portion of said overlapping seam extending longitudinally along said container wall from said closed end to said open end;
    wherein said open end is narrower than at least a portion of said container away from said open end of said container;
    wherein a common one-piece thermoplastic substrate (210) forms both said closed end and said container wall;
    wherein said container has a height (H) extending between said closed end and said open end; wherein at a position along said overlapping seam said container wall has an overlap magnitude (430);
    a. wherein at said position along said overlapping seam at a location that is five times the overlap magnitude away from said overlapping seam said container wall has a container wall Opacity less than about 50%; and
    b. wherein at said position along said overlapping seam said overlapping seam has a seam Opacity that is less than 200% of said container wall Opacity.

B. The container according to Paragraph A, wherein at said position along said overlapping seam at a location that is five times the overlap magnitude away from said overlapping seam said container wall has a container wall Opacity less than about 25%.

C. The container according to Paragraph B, wherein at said position along said overlapping seam said overlapping seam has a seam Opacity that is less than 175% of said container wall Opacity.

D. The container according to any of Paragraphs A to C, wherein at said position said container wall has a thickness away from said overlapping seam and said overlap magnitude is more than about 1.5 times said thickness of said container wall as measured at a distance that is five times said overlap magnitude away from said overlapping seam.

E. The container according to any of Paragraphs A to D, wherein said container further comprises a stretched label (505) bonded to said container wall, wherein said stretched label comprises a label substrate and ink.

F. The container according to any of Paragraphs A to E, wherein at said position along said overlapping seam at a location that is five times the overlap magnitude away from said overlapping seam said container wall has a container wall Opacity less than about 15%.

G. The container according to any of Paragraphs A to D or F, wherein said common one-piece thermoplastic substrate is a distortion printed one-piece thermoplastic substrate (210).

H. The container according to any of Paragraphs A to G, wherein said longitudinal overlapping seam comprises a thermal bond (303).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A container comprising:
an open end;
a closed end opposing said open end;
a container wall extending longitudinally between said closed end and said open end about a longitudinal axis;
an end seam extending at least partially across said closed end; and
a longitudinal overlapping seam extending from said end seam, a portion of said overlapping seam extending longitudinally along said container wall from said closed end to said open end;
wherein said open end is narrower than at least a portion of said container away from said open end of said container;
wherein a common one-piece thermoplastic substrate forms both said closed end and said container wall;
wherein said container has a height extending between said closed end and said open end;
wherein at a position along said overlapping seam said container wall has an overlap magnitude;
wherein at a location that is five times the overlap magnitude away from said overlapping seam and at the same height as said position, said container wall has a container wall Opacity less than 50%; and
wherein at said position said overlapping seam has a seam Opacity that is less than 200% of said container wall Opacity.

2. The container according to claim 1, wherein at said location said container wall Opacity is less than 25%.

3. The container according to claim 2, wherein at said position said seam Opacity is less than 175% of said container wall Opacity.

4. The container according to claim 3, wherein at said position said container wall has a thickness at said position and at said location said container wall has a thickness at said location, wherein said thickness at said position is more than 1.5 times said thickness at said location.

5. The container according to claim 4, wherein said container further comprises a stretched label bonded to said container wall, wherein said stretched label comprises a label substrate and ink.

6. The container according to claim 1, wherein at said location said container wall Opacity is less than 15%.

7. The container according to claim 6, wherein at said position said seam Opacity is less than 175% said container wall Opacity.

8. The container according to claim 7, wherein said container further comprises a stretched label bonded to said container wall, wherein said stretched label comprises a label substrate and ink.

9. The container according to claim 1, wherein at said position said container wall has a thickness at said position and at said location said container wall has a thickness at said location, wherein said thickness at said position is more than 1.5 times said thickness at said location.

10. The container according to claim 1, wherein said container further comprises a stretched label bonded to said container wall, wherein said stretched label comprises a label substrate and ink.

11. The container according to claim 1, wherein said common one-piece thermoplastic substrate is a distortion printed one-piece thermoplastic substrate.

12. The container according to claim 1, wherein said longitudinal overlapping seam comprises a thermal bond.

* * * * *